United States Patent
Shen (10) Patent No.: US 10,910,678 B2
(45) Date of Patent: *Feb. 2, 2021

(54) BATTERY PROTECTION INTEGRATED CIRCUIT AND BATTERY MANAGEMENT SYSTEM

(71) Applicant: ABLIC Inc., Chiba (JP)

(72) Inventor: Biao Shen, Chiba (JP)

(73) Assignee: ABLI INC., Chiba (JP)

( * ) Notice: Subject to any disclaimer, the term of this patent is extended or adjusted under 35 U.S.C. 154(b) by 145 days.

This patent is subject to a terminal disclaimer.

(21) Appl. No.: 16/210,877

(22) Filed: Dec. 5, 2018

(65) Prior Publication Data

US 2019/0173133 A1     Jun. 6, 2019

(30) Foreign Application Priority Data

Dec. 6, 2017 (JP) .................................. 2017-234365

(51) Int. Cl.
   *H01M 10/42*    (2006.01)
   *H02J 7/00*     (2006.01)
   *H02J 13/00*    (2006.01)

(52) U.S. Cl.
   CPC ..... *H01M 10/425* (2013.01); *H01M 10/4207* (2013.01); *H02J 7/0026* (2013.01); *H02J 7/0031* (2013.01); *H02J 13/0003* (2013.01); *H01M 2010/4271* (2013.01)

(58) Field of Classification Search
   CPC ........... H01M 10/425; H01M 10/4207; H01M 2010/4271; H02J 7/0026; H02J 7/0029; H02J 7/0031

USPC .................................................. 320/134, 136
   See application file for complete search history.

(56) References Cited

U.S. PATENT DOCUMENTS

| 2015/0333547 | A1* | 11/2015 | Na ....................... H01M 10/425 361/93.1 |
| 2017/0201104 | A1* | 7/2017  | Jin ......................... H02J 7/0029 |
| 2020/0067326 | A1* | 2/2020  | Shibata ................. H02J 7/0026 |

FOREIGN PATENT DOCUMENTS

JP     2014-124039 A     7/2014

* cited by examiner

*Primary Examiner* — Paul Dinh
(74) *Attorney, Agent, or Firm* — Brinks Gilson & Lione (57) ABSTRACT

The battery protection integrated circuit includes: a higher-level reception terminal configured to receive information from a higher-level circuit; a lower-level transmission terminal configured to transmit information to a lower-level circuit; a storage configured to store a unique identification information; a higher-level signal input terminal configured to be supplied with a permission signal; a lower-level signal output terminal configured to output a second permission signal to the lower-level circuit; a storage controller configured to store a unique identification information when the identification information is not stored, and when the permission signal is supplied; and a switch configured to make the lower-level signal output terminal not provide the second permission signal when the identification information is not stored in the storage, and make the lower-level signal output terminal provide the second permission signal when the identification information is stored in the storage.

11 Claims, 8 Drawing Sheets

Timing Chart of the Battery Protection IC 10a

Timing Chart of the Battery Protection IC 10c

Fig 8

BATTERY PROTECTION INTEGRATED CIRCUIT AND BATTERY MANAGEMENT SYSTEM

RELATED APPLICATIONS

This application claims priority under 35 U.S.C. § 119 to Japanese Patent Application No. 2017-234365 filed on Dec. 6, 2017, the entire content of which is hereby incorporated by reference.

BACKGROUND OF THE INVENTION

1. Field of the Invention

The present invention relates to a battery protection integrated circuit and a battery management system.

2. Description of the Related Art

Hitherto, there has been known a battery management system including protection circuits and a master device in which the protection circuits protect a power supply system which includes a plurality of battery packs connected in series by monitoring the respective battery packs, and the master device serially communicates with each of the protection circuits to collect information of the battery packs (for example, Japanese Patent Application Laid-open No. 2014-124039).

Here, identification information may be assigned to each of the protection circuits to uniquely identify the plurality of protection circuits in the serial communication with the master device. The assignment of the identification information to each of the protection circuits may be achieved by providing a plurality of terminals for detecting the identification information in the protection circuit, and applying a combination of potentials that is different for each of the protection circuits as an identification signal to the plurality of terminals. In this case, it is required for the protection circuit to have the number of terminals with which a maximum number of battery packs that are connected in series as the power supply system can be identified.

With the above-mentioned configuration, the number of terminals increases as the number of protection circuits increases, and hence a package size of the protection circuits cannot be reduced.

SUMMARY OF THE INVENTION

The present invention has been made to provide a battery protection integrated circuit and a battery management system with which a plurality of protection circuits can be individually identified without increasing a package size of the protection circuits.

According to an embodiment of the present invention, there is provided a battery protection integrated circuit including: a higher-level reception terminal connected to a transmission terminal of a higher-level circuit that is adjacent in cascade connection, and configured to receive information from the higher-level circuit; a lower-level transmission terminal connected to a reception terminal of a lower-level circuit that is adjacent in the cascade connection, and configured to transmit information to the lower-level circuit; a storage configured to store the information received by the higher-level reception terminal as a unique identification information; a higher-level signal input terminal configured to be supplied from the higher-level circuit with a permission signal indicating permission of communication; a lower-level signal output terminal configured to output a second permission signal to the lower-level circuit, the second permission signal being generated based on the permission signal supplied to the higher-level signal input terminal; a storage controller configured to store the identification information received by the higher-level reception terminal as a unique identification information in the storage under a condition that the identification information is not stored in the storage, and that the permission signal is supplied to the higher-level signal input terminal; and a switch configured to put the lower-level signal output terminal to a state in which an output of the second permission signal is not provided when the identification information is not stored in the storage, and put the lower-level signal output terminal to a state in which an output of the second permission signal is provided when the identification information is stored in the storage.

According to one embodiment of the present invention, it is possible to provide the battery protection integrated circuit and the battery management system with which a plurality of protection circuits can be individually identified without increasing the package size of the protection circuits.

DETAILED DESCRIPTION OF THE PREFERRED EMBODIMENTS

Embodiment

Figure 1:
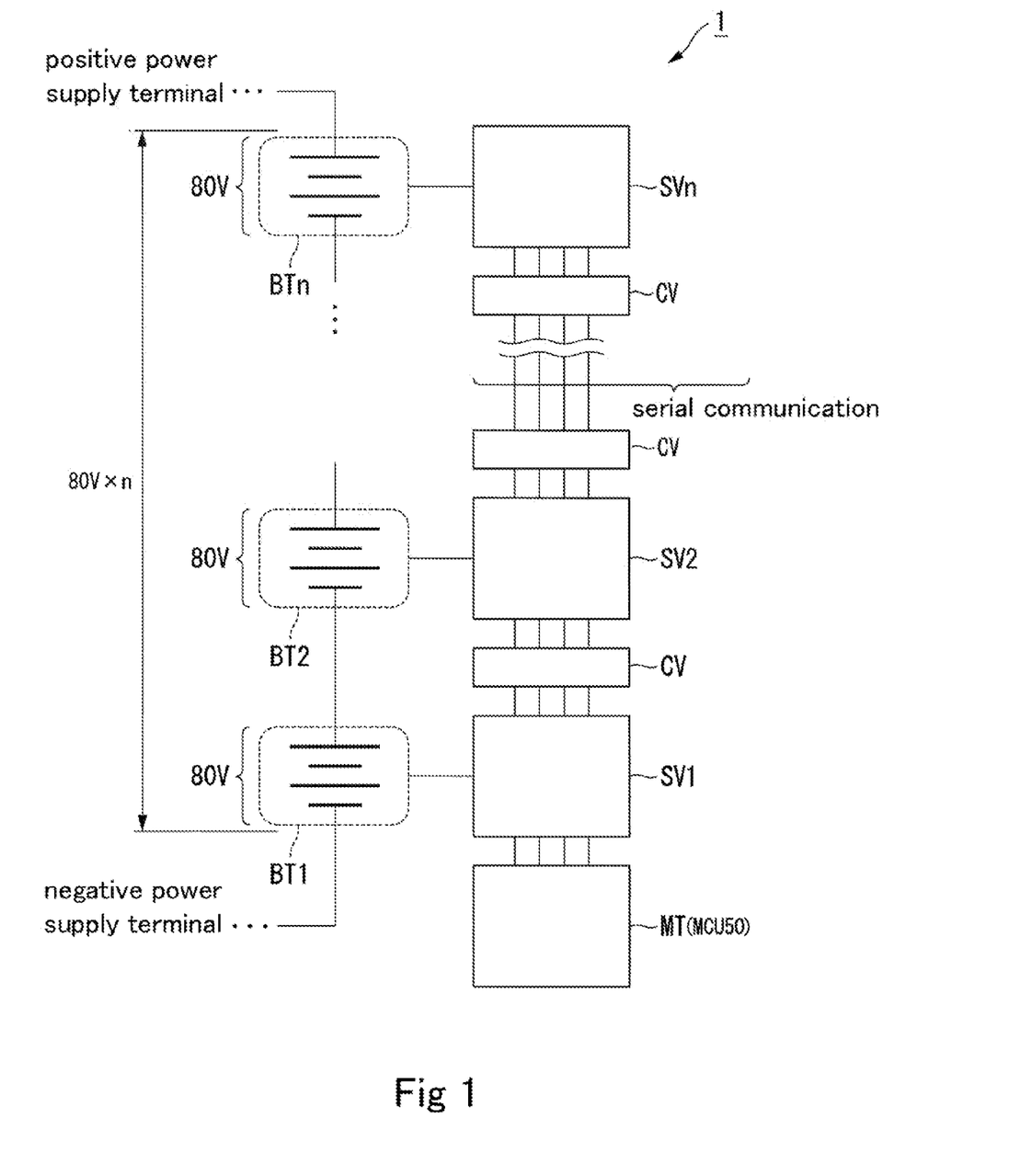
FIG. 1 is a diagram for schematically illustrating a battery management system using battery protection ICs according to an embodiment of the present invention.

Now, an embodiment of the present invention is described referring to the accompanying drawings
<Outline of Battery Management System 1>
FIG. 1 is a diagram for schematically illustrating a battery management system 1 using battery protection integrated circuits (hereinafter referred to as "ICs") according to an embodiment of the present invention.

As illustrated in FIG. 1, the battery management system 1 includes a plurality of DC voltage sources (hereinafter referred to as "battery packs BT1 to BTn"), a plurality of battery protection devices SV (hereinafter referred to as "battery protection devices SV1 to SVn"), a plurality of voltage converters CVs, and an information collection device MT. In the following description, when the battery packs BT1 to BTn are not distinguished from one another, the battery packs BT1 to BTn are collectively referred to as the "battery pack BT", and when the battery protection devices SV1 to SVn are not distinguished from one another, the battery protection devices SV1 to SVn are collectively referred to as the "battery protection device SV".

The plurality of battery packs BTs is connected in series to one another to supply a voltage desired by a user. In the illustrated example, n (n>0) battery packs BT, namely, the battery pack BT1 to the battery pack BTn are connected in series to one another, and one battery pack BT supplies a voltage of 80 V. A voltage of n times 80 V can thus be supplied by the battery packs BT1 to the battery pack BTn. A negative terminal of the battery pack BT1 is connected to a negative power supply terminal of a supplied device to which a DC power supply is supplied, and a positive terminal of the battery pack BTn is connected to a positive power supply terminal of the supplied device. In the above description, there has been described the case in which the voltage of 80 V is supplied by each of the battery packs BT, but the present invention is not limited thereto. Of the plurality of battery packs BT included in the battery management system 1, a part of the battery packs BTs may supply a voltage that is different from those of the other part of battery packs BTs. For example, there may be adopted a configuration in which two battery packs each supplying the voltage of 80 V and one battery pack supplying a voltage of 40 V are connected in series to one another to supply 200 V.

The battery protection device SV is provided for each of the battery packs BTs to monitor state of each battery pack BT, such as a voltage value and a charging rate of the battery pack BT, and protect the battery pack BT. In the illustrated example, the battery protection devices SV1 to SVn monitor and protect the battery packs BT1 to BTn, respectively.

The information collection device MT is configured to acquire information indicating states of the battery packs BTs respectively acquired by the battery protection devices SVs through serial communication. In the embodiment, the serial communication between the battery protection devices SVs and the information collection device MT is achieved by a serial peripheral interface (SPI), for example. Moreover, in the serial communication between the battery protection devices SVs and the information collection device MT, a master device is the information collection device MT, and slave devices are the battery protection devices SVs. Between the battery protection devices SVs and the information collection device MT, four kinds of lines, namely, a data transmission line, a data reception line, a clock line, and a chip select signal line are provided. In the following description, the four kinds of line are collectively referred to as "communication line". The communication line is cascade-connected between the information collection device MT and a battery protection device SV, and between each pair of adjacent battery protection devices SVs via a voltage converter CV.

Here, each of the battery protection devices SVs operates on a reference potential of the battery pack BT under protection (for example, potential of a negative terminal of the battery pack BT) for the reference potential of operation. The battery packs BT1 to BTn are connected in series to one another, and hence have reference potentials that are different from one another. For example, the battery protection device SV2 has an operating reference potential that is higher by that of the battery pack BT1 (in this example, 80 V) under protection of the battery protection device SV1. The voltage converter CV converts the operating reference potential for signals transmitted and received through the communication lines between the battery protection device SV1 and the battery protection device SV2. Specifically, in the signals from the battery protection device SV1 to the battery protection device SV2 the reference potential is stepped up by 80 V by the voltage converter CV before transmission. Moreover, in the signals from the battery protection device SV2 to the battery protection device SV1 the reference potential is stepped down by 80 V by the voltage converter CV before transmission. The voltage converter CV is provided between two adjacent battery protection devices SVs to convert reference voltages of signals transmitted and received between the battery protection devices SVs in the same manner as described above.

<Identification Information ID of Battery Protection ICs 10>

The battery protection devices SVs include battery protection ICs 10. The information collection device MT includes a micro control unit (MCU) 50. In the following description, the cascade connection between the information collection device MT and the battery protection devices SVs is also referred to as "cascade connection between the battery protection ICs 10 and the MCU 50". A battery protection IC 10 is configured to execute processing regarding the serial communication with the MCU 50 or other battery protection ICs 10. The MCU 50 is configured to execute processing regarding the serial communication with the battery protection ICs 10. In the following description, of the battery protection ICs 10 cascade-connected to the MCU 50, a battery protection IC 10 closer to the MCU 50 is referred to as a "higher-level circuit", and a battery protection IC 10 farther from the MCU 50 is referred to as a "lower-level circuit". In the serial communication between the information collection device MT and the battery protection devices SVs, it is required for a battery protection IC 10 included in each of the battery protection devices SVs to have information (hereinafter referred to as "identification information ID") with which the battery protection IC 10 can be uniquely identified. A detailed description is given below of a configuration for assigning the identification information ID that is unique to each battery protection IC 10.

<Configuration of Battery Protection Device SV>

Figure 2:
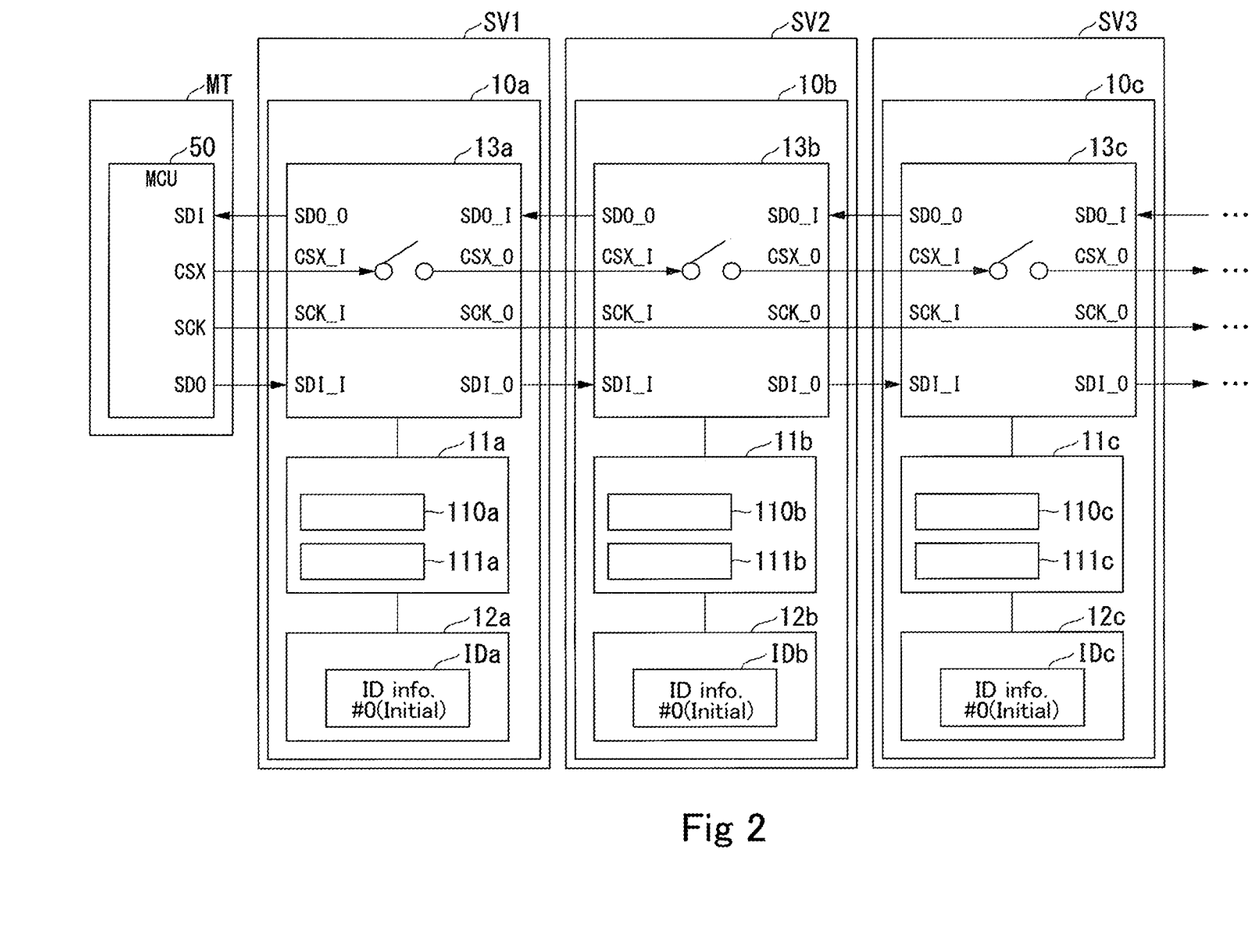
FIG. 2 is a diagram for illustrating an example of the first state of a functional configuration of the battery protection ICs according to the embodiment.

FIG. 2 is a diagram for illustrating an example of the first state of a functional configuration of the battery protection ICs 10 according to the embodiment. Specifically, FIG. 2 is a diagram for illustrating the functional configuration in an initial state of the battery protection ICs 10. The "initial state" refers to a state in which the unique identification information ID is not assigned to any of the battery protection ICs 10.

In the following description, of the battery protection devices SVs included in the battery management system 1, a battery protection IC 10 included in the battery protection device SV1 is notated as a "battery protection IC 10a", a battery protection IC 10 included in the battery protection device SV2 is notated as a "battery protection IC 10b", and a battery protection IC 10 included in the battery protection device SV3 is notated as a "battery protection IC 10c". Moreover, components relating to the battery protection IC 10a are denoted by reference symbols suffixed by "a". Moreover, components relating to the battery protection IC 10b are denoted by reference symbols suffixed by "b". Moreover, components relating to the battery protection IC 10c are denoted by reference symbols suffixed by "c". Further, when the components are not distinguished from one another as to which battery protection IC 10 the components relate to, the suffixes "a", "b" or "c" are omitted.

Further, in the following description of FIG. 2, FIG. 4, FIG. 6, and FIG. 8, a description of the voltage converters CVs arranged between the battery protection device SV1 and the battery protection device SV2, and between the battery protection device SV2 and the battery protection device SV3 is omitted, and the description is given assuming that the signals between the battery protection devices SVs are changed in voltage by the voltage converter CV.

As illustrated in FIG. 2, the battery protection IC 10 includes a controller 11, a storage 12, and a communication unit 13. The controller 11 implements a storage controller 110 and a switch 111 as its functional units through execution of a program (software) by a central processing unit (CPU) or other hardware processor. Moreover, a part or all (excluding a storage included therein) of the controller 11 may be implemented by a large scale integration (LSI), an application specific integrated circuit (ASIC), a field-programmable gate array (FPGA), a graphics processing unit (GPU), or other hardware (circuit portion; including circuitry), or may be implemented through cooperation of software and hardware. The storage 12 is implemented by a random access memory (RAM) or other volatile memory, and is configured to store the identification information ID. When the battery protection device SV is powered on or initialized, or other occasions, the identification information ID stored in the storage 12 indicates an initial value (in this example, "0"). In the example illustrated in FIG. 2, identification information IDa to IDc having initial values are stored in storages 12a to 12c, respectively. The "initial value" includes an indefinite value in which the identification information ID is not stored.

The storage controller 110 is configured to store the received identification information ID as identification information ID of the battery protection IC 10 in the storage 12 when a chip select signal is supplied to the battery protection IC 10 and the data indicating the identification information ID is received, and when the identification information ID having the initial value is stored in the storage 12. The switch 111 is configured to switch a state of the communication unit 13 depending on a state of an identification information setting flag. The identification information setting flag is a flag indicating that the received identification information ID is stored in the storage 12.

The communication unit 13 is configured to serially communicate with the information collection device MT or the other battery protection devices SVs under control of the controller 11. The communication unit 13 includes four terminals connected to an adjacent higher-level circuit through the communication line, and four terminals connected to an adjacent lower-level circuit through the communication line. A detailed description is now given of the connection between the communication unit 13 of the battery protection IC 10 and the other battery protection ICs.

<Connection of Communication Unit 13>

The communication unit 13 includes the following four terminals connected to the adjacent higher-level circuit through the communication line: a data transmission terminal SDO_O, a chip select reception terminal CSX_I, a clock reception terminal SCK_I, and a data reception terminal SDI_I. The data transmission terminal SDO_O is connected to a data reception terminal SDI or a data reception terminal SDO_I of the adjacent higher-level circuit through the data transmission line. The chip select reception terminal CSX_I is connected to a chip select transmission terminal CSX or a chip select transmission terminal CSX_O of the adjacent higher-level circuit through the chip select signal line. The clock reception terminal SCK_I is connected to a clock transmission terminal SCK or a clock transmission terminal SCK_O of the adjacent higher-level circuit through the clock line. The data reception terminal SDI_I is connected to a data transmission terminal SDO or a data transmission terminal SDI_O of the adjacent higher-level circuit through the data reception line.

The communication unit 13 also includes the following four terminals connected to the adjacent lower-level circuit through the communication line: a data reception terminal SDO_I, a chip select transmission terminal CSX_O, a clock transmission terminal SCK_O, and a data transmission terminal SDI_O. The data reception terminal SDO_I is connected to a data transmission terminal SDO_O of the adjacent lower-level circuit through the data transmission line. The chip select transmission terminal CSX_O is connected to a chip select reception terminal CSX_I of the adjacent lower-level circuit through the chip select signal line. The clock transmission terminal SCK_O is connected to a clock reception terminal SCK_I of the adjacent lower-level circuit through the clock line. The data transmission terminal SDI_O is connected to a data reception terminal SDI_I of the adjacent lower-level circuit through the data reception line.

<Regarding Terminals>

A description is now given of the terminals included in the communication unit 13. To the clock reception terminal SCK_I, a clock signal is supplied from the higher-level circuit. The clock transmission terminal SCK_O supplies, to the lower-level circuit, the clock signal supplied to the clock reception terminal SCK_I. The communication unit 13 is configured to transmit and receive data based on the clock signal. Specifically, the data transmitted and received by the data transmission terminal SDO_O and the data reception terminal SDI_I to and from the higher-level circuit is transmitted and received in synchronization with rise or fall of the clock signal. Moreover, data transmitted and received by the data reception terminal SDO_I and the data transmission terminal SDI_O to and from the lower-level circuit is transmitted and received in synchronization with the rising or falling of the clock signal.

To the chip select reception terminal CSX_I, the chip select signal is supplied from the higher-level circuit. The switch 111 is configured to switch, based on the identification information setting flag, the chip select transmission terminal CSX_O to any one of a state of not supplying, to the lower-level circuit, the chip select signal supplied to the chip select reception terminal CSX_I and a state of supplying the chip select signal to the lower-level circuit. As illustrated in FIG. 2, in the initial state, the chip select transmission terminal CSX_O is in the state of not supplying, to the lower-level circuit, the chip select signal supplied to the chip select reception terminal CSX_I. The chip select signal is a signal supplied by the information collection device MT (MCU 50) which is the master device of the serial communication and is a signal indicating the battery protection IC 10 with which the serial communication is performed. Specifically, the chip select signal is a signal that is changed between two states: high level and low level. Of the battery protection ICs 10, the battery protection IC 10 to which the chip select signal having the low level is supplied transmits and receives the data to and from the higher-level circuit and the lower-level circuit. The state of not supplying the chip select signal to the lower-level circuit is a state of not supplying a signal to the lower-level circuit. Under this state, the chip select signal line is not electrically controlled to a high-impedance state.

The data reception terminal SDO_I is configured to receive the data from the lower-level circuit. Moreover, the data transmission terminal SDO_O is configured to transmit, to the higher-level circuit, the data received by the data reception terminal SDO_I. The data reception terminal SDI_I is configured to receive data from the higher-level circuit. Here, the data transmitted from the higher-level circuit to the lower-level circuit under the initial state is, for example, data indicating identification information ID of the lower-level circuit. The storage controller 110 is configured to store, when the chip select signal is supplied to the battery protection IC 10 and the identification information setting flag which is to be described later is in an OFF state, the received identification information ID as the identification information ID of the self-circuit in the storage 12. Moreover, the controller 11 is configured to add a predetermined value (in this example, "1") to the received identification information ID to generate the identification information ID of the lower-level circuit. The communication unit 13 is configured to transmit the data generated by the controller 11 and indicating the identification information ID of the adjacent lower-level circuit from the data transmission terminal SDI_O to the lower-level circuit. The data transmission line and the data reception line may be used in common. In this case, the common line is used as line for transmitting commands and data from the higher-level circuit to the lower-level circuit in a normal operation, and is used as line for transmitting data from the lower-level circuit to the higher-level circuit in an operation of reading information indicating the states of the battery packs BT and other information. The types of communication line between the battery protection ICs 10 can be reduced by determining in advance the operations of the common line as described above.

<Operation Until Identification Information ID is Assigned to Battery Protection IC 10a>

Figure 3:
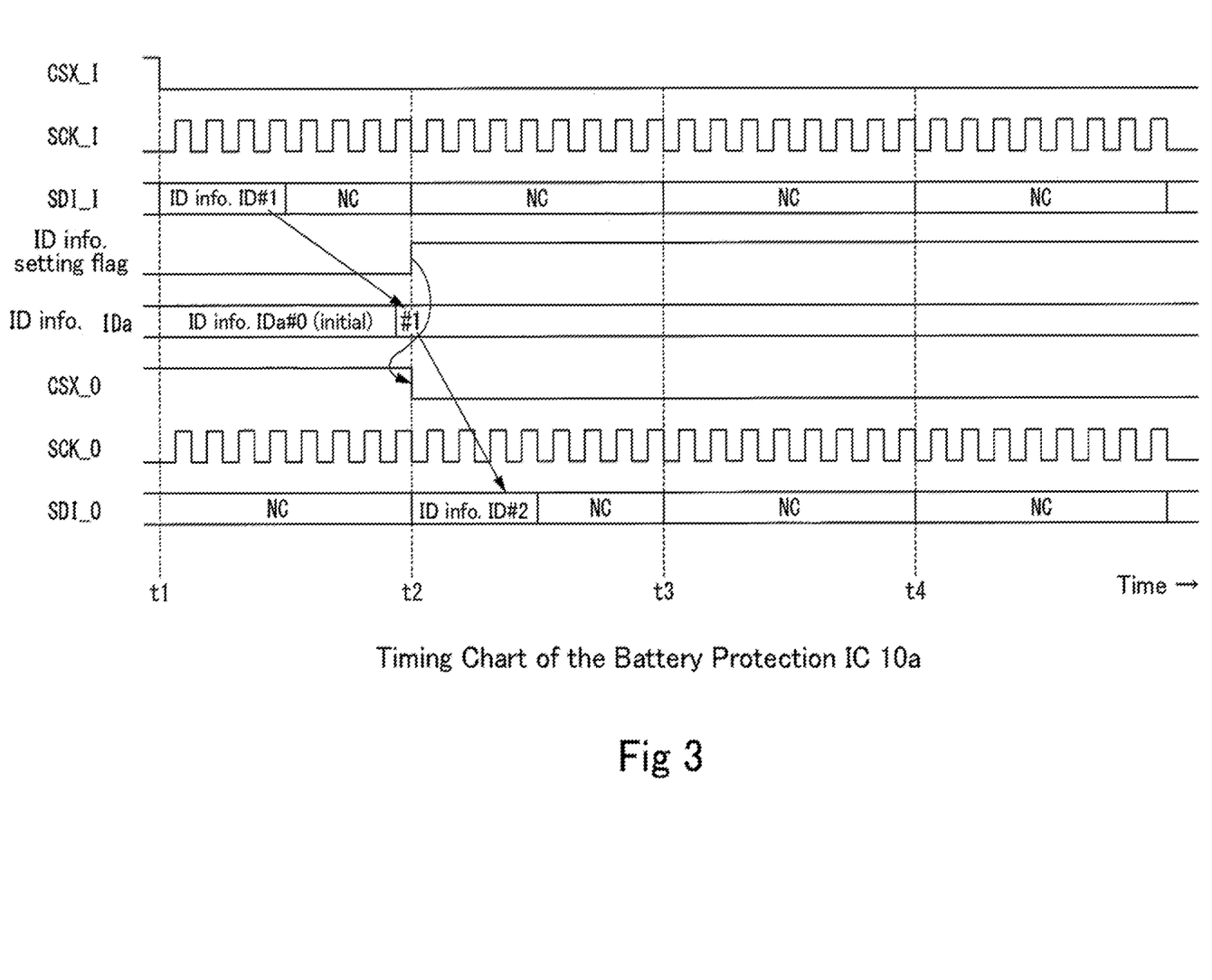
FIG. 3 is a diagram for illustrating a timing chart of a battery protection IC 10a according to the embodiment.

FIG. 3 is a diagram for illustrating a timing chart of the battery protection IC 10a according to the embodiment. As illustrated in FIG. 3, at time t1, the clock signal is supplied to the clock reception terminal SCK_I from a clock transmission terminal (illustrated clock transmission terminal SCK) of the MCU 50. Moreover, at time t1, the chip select signal having the low level is supplied to the chip select reception terminal CSX_I from a chip select transmission terminal (illustrated chip select transmission terminal CSX) of the MCU 50. Here, the MCU 50 and the battery protection ICs 10 transmit and receive 1 bit of data for each fall of the clock signal. Moreover, the MCU 50 and the battery protection ICs 10 transmit and receive 8 bits as one data unit. Accordingly, the MCU 50 supplies the chip select signal for a time period corresponding to the number of clocks in which the identification information ID of the cascade-connected battery protection ICs 10 can be transmitted.

From time t1 to a time when the 8th fall of the clock signal occurs (illustrated time t2), the data reception terminal SDI_I of the battery protection IC 10a receives data indicating "1" as identification information IDa of the battery protection IC 10a from a data transmission terminal (illustrated data transmission terminal SDO) of the MCU 50. Because the chip select signal having the low level is supplied and the identification information setting flag is in the OFF state, a storage controller 110a stores, at time t2, the received identification information IDa indicating "1" as the identification information IDa of the battery protection IC 10a in the storage 12a.

In the following description, storing the identification information ID of the battery protection IC 10 in the storage 12 is also referred to as assigning the identification information ID to the battery protection IC 10.

With the assignment of the identification information IDa to the battery protection IC 10a, a controller 11a sets, at time t2, the identification information setting flag of the battery protection IC 10a to ON (high level). With the setting of the identification information setting flag to ON at time t2, a switch 111a switches the state of the chip select transmission terminal CSX_O to the state of supplying, to the lower-level circuit, the chip select signal supplied to the chip select reception terminal CSX_I. Moreover, the controller 11a transmits, from the data transmission terminal SDI_O to the battery protection IC 10b, "2" obtained by adding "1" to "1" indicating the identification information IDa of the battery protection IC 10a received by the data reception terminal SDI_I.

Here, the chip select signal supplied to the lower-level circuit when the switch 111 switches the state of the chip select transmission terminal CSX_O is an example of a second permission signal.

<Configuration of Battery Protection IC 10b>

Figure 4:
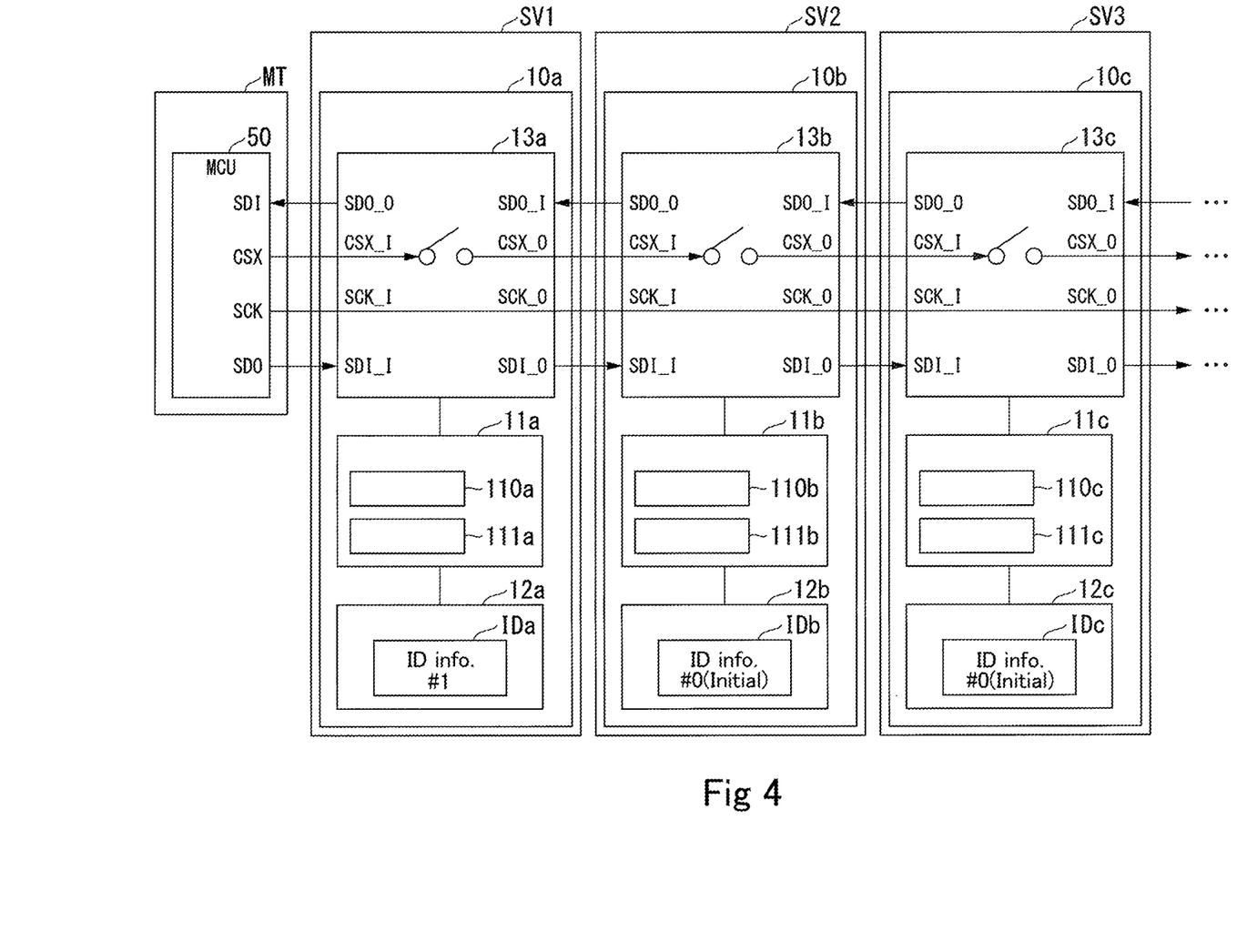
FIG. 4 is a diagram for illustrating an example of the second state of the functional configuration of the battery protection ICs according to the embodiment.

FIG. 4 is a diagram for illustrating an example of the second state of the functional configuration of the battery protection ICs 10 according to the embodiment. The second state is a state after the initial state, and is a state in which the identification information IDa is assigned to the battery protection IC 10a and the identification information ID is not assigned to the other battery protection ICs 10.

As illustrated in FIG. 4, the second state is different from the initial state in that the state of the chip select transmission terminal CSX_O of the battery protection IC 10a has been switched to a state of supplying, to the battery protection IC 10b, the chip select signal supplied to the chip select reception terminal CSX_I. The chip select signal is supplied from the battery protection IC 10a to the battery protection IC 10b at time t2.

<Operation Until Identification Information ID is Assigned to Battery Protection IC 10b>

Figure 5:
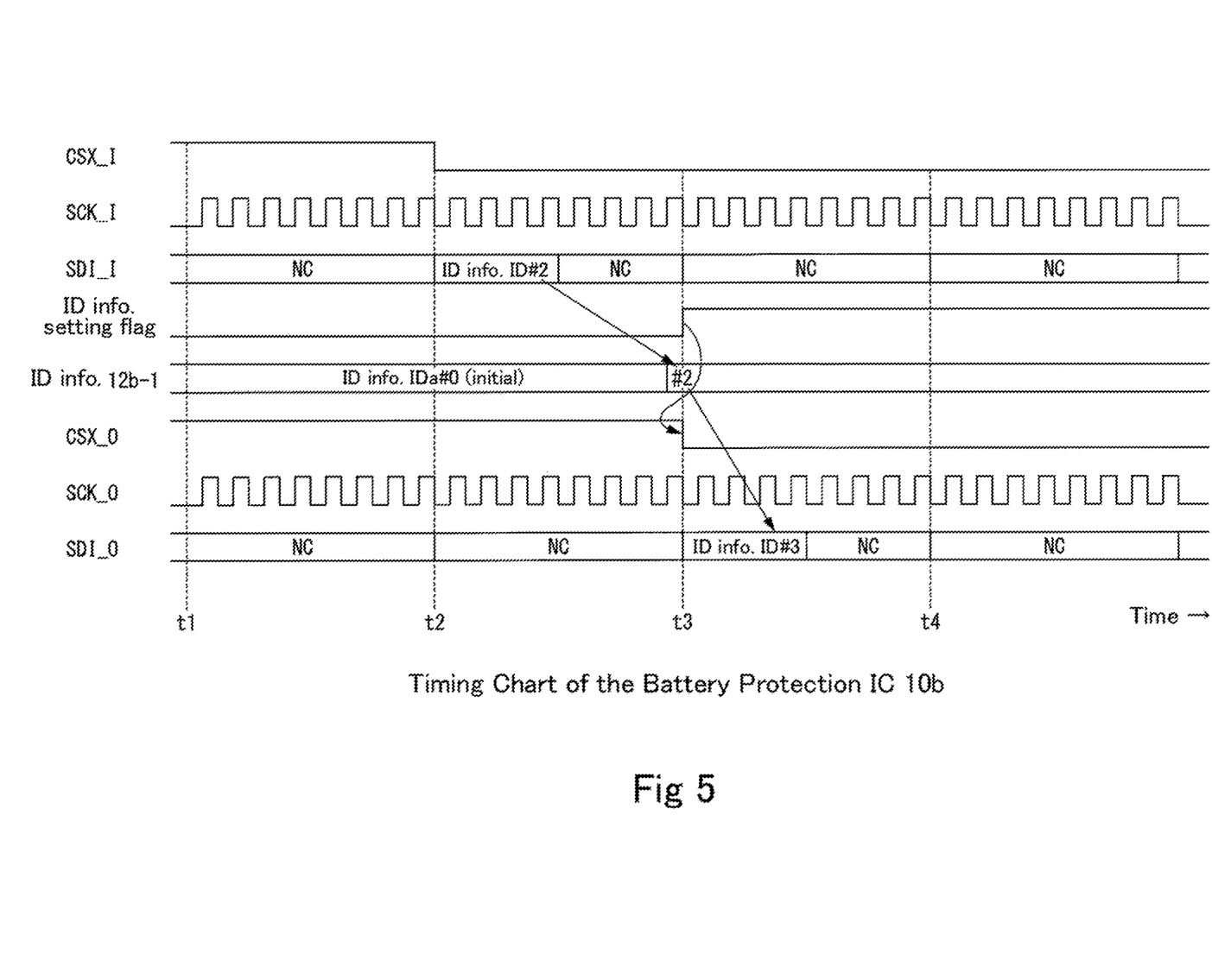
FIG. 5 is a diagram for illustrating a timing chart of a battery protection IC 10b according to the embodiment.

FIG. 5 is a diagram for illustrating a timing chart of the battery protection IC 10b according to the embodiment. As illustrated in FIG. 3 and FIG. 5, the chip select signal having the low level is supplied from the chip select transmission terminal CSX_O of the battery protection IC 10a to the chip select reception terminal CSX_I of the battery protection IC 10b at time t2. In other words, the chip select signal having the high level is supplied from the battery protection IC 10a to the chip select reception terminal CSX_I in a period from time t1 to time t2, and the battery protection IC 10b does not transmit or receive data in the period from time t1 to time t2. Moreover, the clock signal is supplied from the clock transmission terminal of the battery protection IC 10a to the clock reception terminal SCK_I.

From time t2 to a time when the 8th fall of the clock signal occurs (illustrated time t3), the data reception terminal SDI_I of the battery protection IC 10b receives data indicating "2" as identification information IDb of the battery protection IC 10b from the battery protection IC 10a. Because the chip select signal having the low level is supplied and the identification information setting flag is in the OFF state, a storage controller 110b stores, at time t3, the received identification information IDb indicating "2" as the identification information IDb of the battery protection IC 10b in the storage 12b.

With the assignment of the identification information IDb to the battery protection IC 10b, a controller 11b sets, at time t3, the identification information setting flag of the battery protection IC 10b to ON (high level). With the setting of the identification information setting flag to ON at time t3, a switch 111b switches the state of the chip select transmission terminal CSX_O to the state of supplying, to the lower-level circuit, the chip select signal supplied to the chip select reception terminal CSX_I. Moreover, the controller 11b transmits, from the data transmission terminal SDI_O to the battery protection IC 10c, "3" obtained by adding "1" to "2" indicating the identification information IDb of the battery protection IC 10b received by the data reception terminal SDI_I.

<Configuration of Battery Protection IC 10c>

Figure 6:
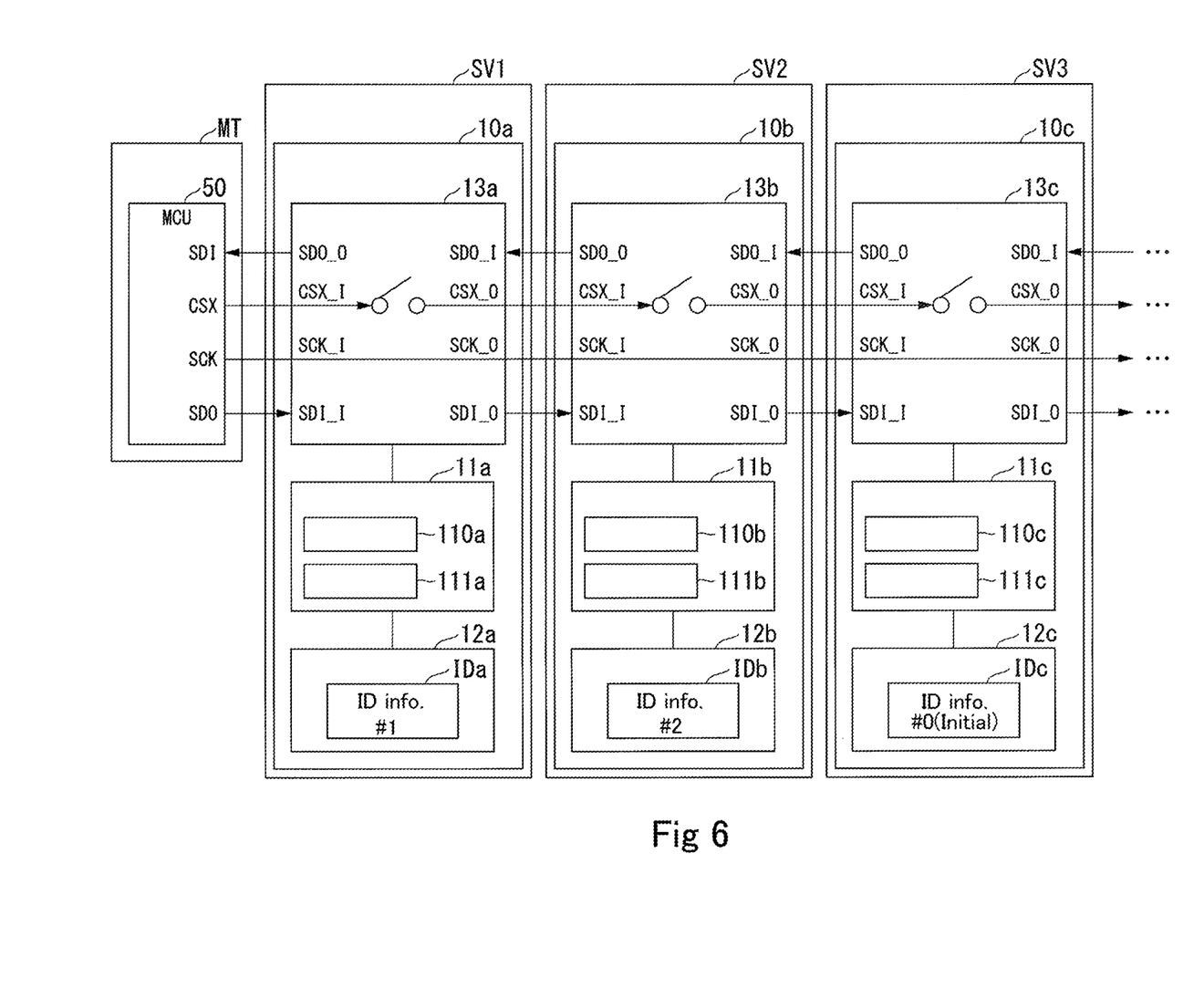
FIG. 6 is a diagram for illustrating an example of the third state of the functional configuration of the battery protection ICs according to the embodiment.

FIG. 6 is a diagram for illustrating an example or the third state of the functional configuration of the battery protection IC 10c according to the embodiment. The third state is a state after the second state, and is a state in which the identification information ID is assigned to the battery protection IC 10a and the battery protection IC 10b and the identification information ID is not assigned to the battery protection IC 10c.

As illustrated in FIG. 6, the third state is different from the initial state and the second state in that the state of the chip select transmission terminal CSX_O of the battery protection IC 10a and the battery protection IC 10b is switched to a state of supplying, to the lower-level circuit, the chip select signal supplied to the chip select reception terminal CSX_I. The chip select signal is supplied from the battery protection IC 10b to the battery protection IC 10c at time t3.

<Operation Until Identification Information ID is Assigned to Battery Protection IC 10c>

Figure 7:
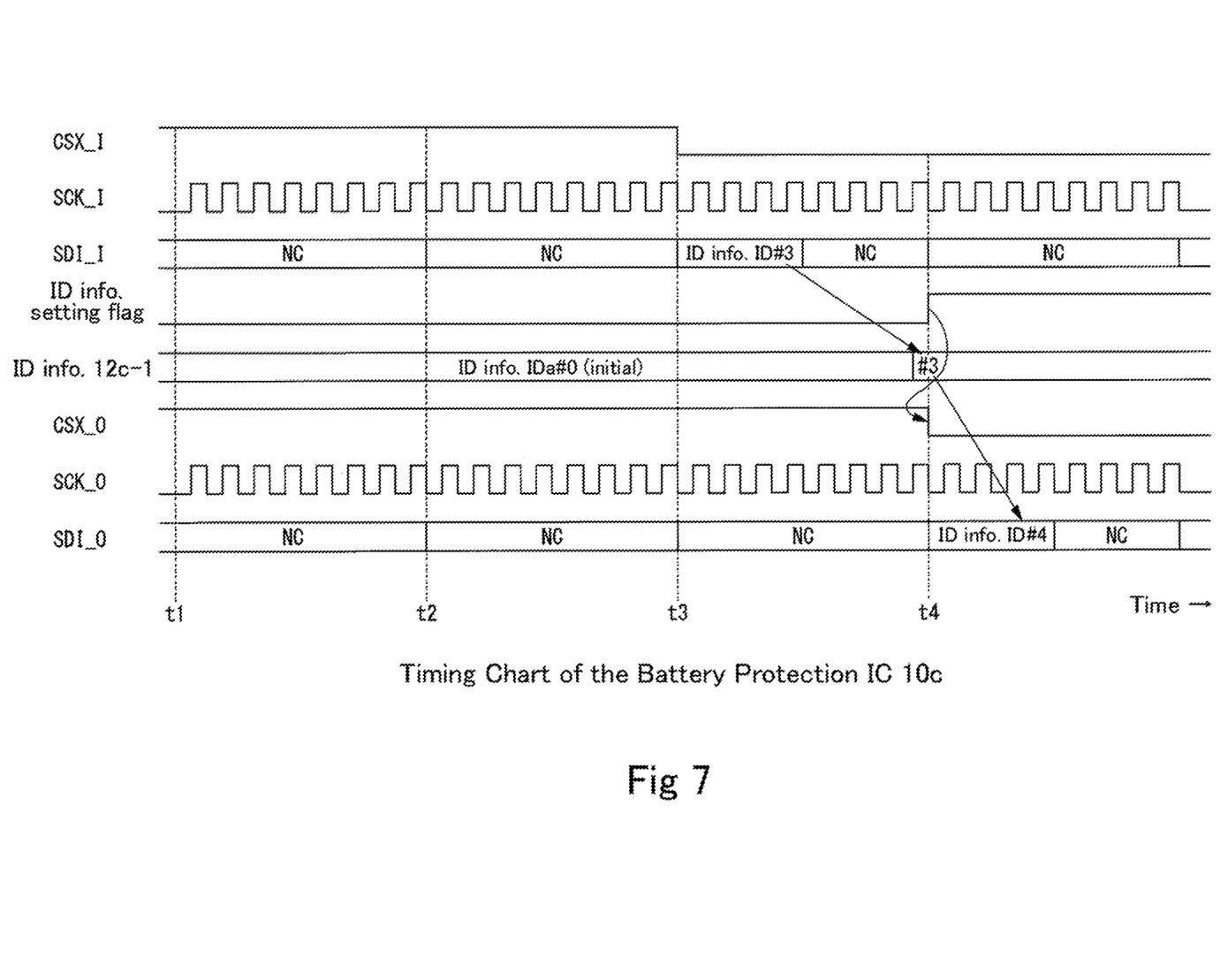
FIG. 7 is a diagram for illustrating a timing chart of a battery protection IC 10c according to the embodiment.

FIG. 7 is a diagram for illustrating a timing chart of the battery protection IC 10c according to the embodiment. As illustrated in FIG. 5 and FIG. 7, the chip select signal having the low level is supplied from the chip select transmission terminal CSX_O of the battery protection IC 10b to the chip select reception terminal CSX_I of the battery protection IC 10c at time t3. In other words, the chip select signal having the high level is supplied from the battery protection IC 10b to the chip select reception terminal CSX_I in a period from time t1 to time t3, and the battery protection IC 10c does not transmit or receive data in the period from time t1 to time t3. Moreover, the clock signal is supplied from the clock transmission terminal of the battery protection IC 10b to the clock reception terminal SCK_I.

From time t3 to a time when the 8th fall of the clock signal occurs (illustrated time t4), the data reception terminal SDI_I of the battery protection IC 10c receives data indicating "3" as identification information IDc of the battery protection IC 10c from the battery protection IC 10b. Because the chip select signal having the low level is supplied and the identification information setting flag is in the OFF state, a storage controller 110c stores, at time t4, the received identification information IDc indicating "3" as the identification information IDc of the battery protection IC 10c in the storage 12c.

With the store of the identification information IDc in the battery protection IC 10c, a controller 11c sets, at time t4, the identification information setting flag of the battery protection IC 10c to ON (high level). With the setting of the identification information setting flag to ON at time t4, a switch 111c switches the state of the chip select transmission terminal CSX_O to the state of supplying, to the lower-level circuit, the chip select signal supplied to the chip select reception terminal CSX_I. Moreover, the controller 11c transmits, from a data transmission terminal SDI_O to a lower-level circuit (for example, battery protection IC 10d) of the battery protection IC 10c, "4" obtained by adding "1" to "3" indicating the identification information IDc of the battery protection IC 10c received by the data reception terminal SDI_I.

With the above-mentioned configuration, different identification information ID can be assigned to the battery protection ICs 10. The identification information ID stored in the storage 12 holds the identification information ID until the battery protection device SV is powered off or the battery protection device SV is initialized.

<Case in which Predetermined Value is Subtracted to Transmit Identification Information ID>

In the above description, there has been described the case in which the controller 11 adds the predetermined value (in this example, "1") to the identification information ID to transmit the result from the data transmission terminal SDI_O, but the present invention is not limited thereto. The controller 11 may subtract a predetermined value (for example, "1") from the identification information ID to transmit the result from the data transmission terminal SDI_O, for example. In this case, the highest-level circuit (MCU 50) transmits identification information ID indicating a value corresponding to the number of cascade-connected battery protection ICs 10 to the lower-level circuit. Moreover, a value to be added or subtracted may be a value other than "1", and may be any value. Moreover, the battery protection IC 10 may generate the identification information ID to be transmitted to the lower-level circuit by processing other than the addition or the subtraction. The battery protection IC 10 may generate the identification information ID to be transmitted to the lower-level circuit by any processing as long as the processing generates non-duplicating identification information ID of the battery protection ICs 10, for example.

<Case in which Supply State of Clock Signal is Switched>

Moreover, in the above description, there has been described the case in which the switch 111 switches the chip select transmission terminal CSX_O to any one of the state of not supplying, to the lower-level circuit, the chip select signal supplied to the chip select reception terminal CSX_I and the state of supplying the chip select signal to the lower-level circuit, but the present invention is not limited thereto. The switch 111 may have a configuration of switching between a state of not supplying the clock signal to the lower-level circuit and a state of supplying the clock signal to the lower-level circuit instead of the chip select signal, for example.

Figure 8:
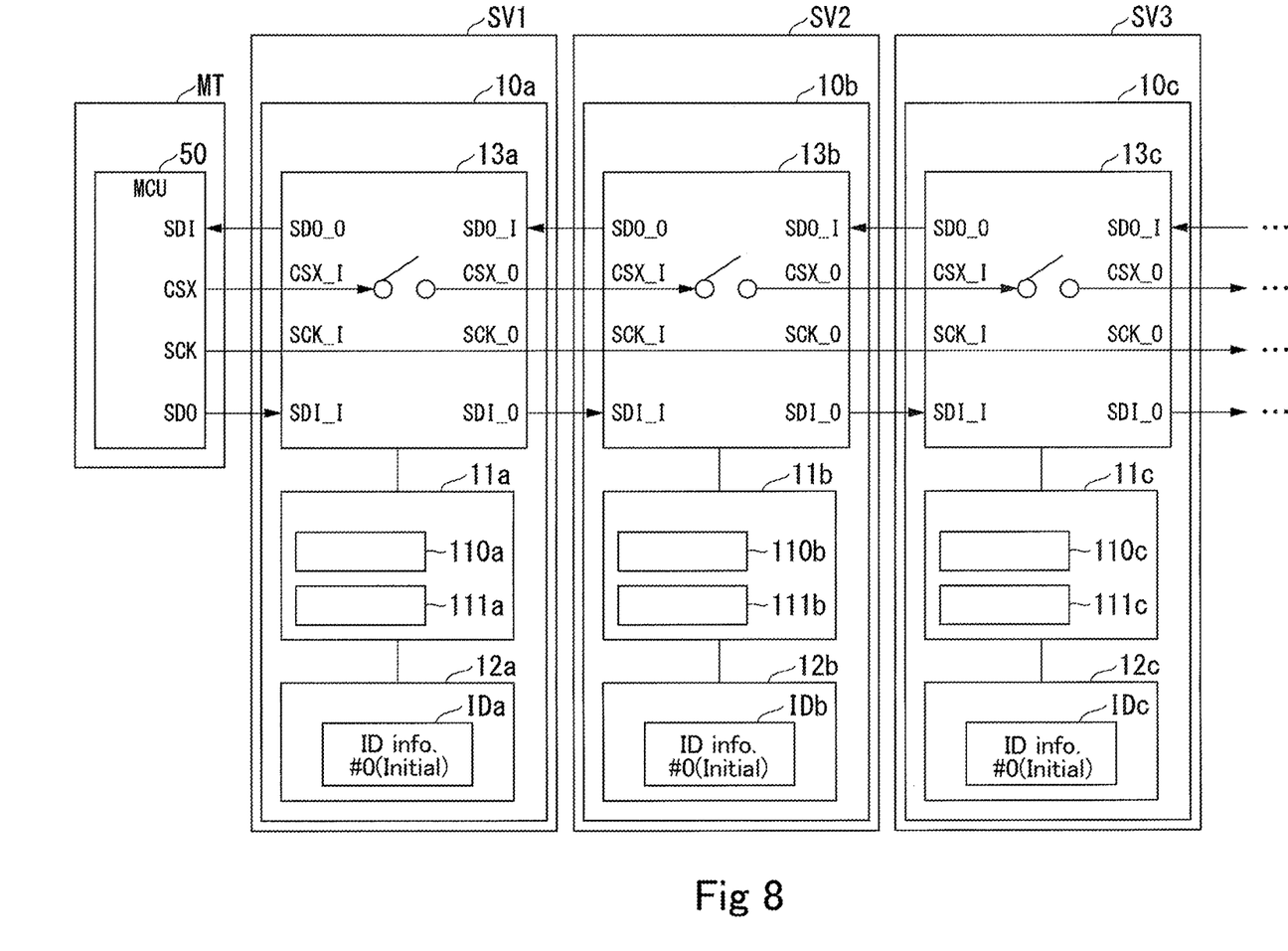
FIG. 8 is a diagram for illustrating an initial state for another example of the functional configuration of the battery protection ICs in which supply state of clock signal is switched according to the embodiment.

FIG. 8 is a diagram for illustrating an initial state for another example of the functional configuration of the battery protection ICs 10 according to the embodiment.

As illustrated in FIG. 8, in an initial state, the clock transmission terminal SCK_O is in the state of not supplying, to the lower-level circuit, the clock signal supplied to the clock reception terminal SCK_I. Moreover, with the setting of the identification information setting flag to ON, the switch 111 switches the clock transmission terminal SCK_O to the state of supplying the clock signal to the lower-level circuit. Even when data indicating the identification information ID is received, the battery protection IC 10 of the lower-level circuit does not store the identification information ID in the storage 12 until the clock signal is received, that is, until the identification information ID is assigned to the adjacent higher-level circuit. Accordingly, the assignment of the same identification information ID to adjacent battery protection ICs 10 can be prevented. In other words, different identification information ID can be assigned to the battery protection ICs 10.

Here, the clock signal transmitted to the lower-level circuit when the switch 111 switches the state of the clock transmission terminal SCK_O is another example of the second permission signal.

SUMMARY

As described above, the battery protection IC 10 according to the embodiment has a higher-level reception terminal (data reception terminal SDI_I) connected to a transmission terminal of the higher-level circuit that is adjacent in cascade connection and is configured to receive information from the higher-level circuit; a lower-level transmission terminal (data transmission terminal SDI_O) connected to a reception terminal of the lower-level circuit that is adjacent in the cascade connection and is configured to transmit information to the lower-level circuit; the storage (storage 12) in which the information received by the higher-level reception terminal is to be stored as the identification information (identification information ID) for uniquely identifying the plurality of battery protection ICs; a higher-level signal input terminal (chip select reception terminal CSX_I or clock reception terminal SCK_I) to which a permission signal (chip select signal or clock signal) indicating permission of communication is to be supplied from the higher-level circuit; a lower-level signal output terminal (chip select transmission terminal CSX_O or clock transmission terminal SCK_O) configured to output the second permission signal (chip select signal or clock signal) to the lower-level circuit, the second permission signal being generated based on the permission signal supplied to the higher-level signal input terminal; the storage controller 110 configured to store, in the storage 12, the identification information ID received by the higher-level reception terminal as information for uniquely identifying the self-circuit when the identification information ID is not stored in the storage 12, and when the permission signal is supplied to the higher-level signal input terminal; and the switch 111 configured to switch the lower-level signal output terminal to the state of not outputting the second permission signal when the identification information ID is not stored in the storage 12, and switch the lower-level signal output terminal to the state of outputting the second permission signal when the identification information ID is stored in the storage 12.

According to the battery protection ICs 10 of the embodiment, a serial communication line is cascade-connected for the plurality of battery protection ICs 10 from the highest-level circuit to the lowest-level circuit. In general, when the serial communication line is cascade-connected among the plurality of battery protection ICs 10, under a state in which the identification information ID is not assigned to the battery protection ICs 10, the MCU 50 cannot individually identify the battery protection ICs 10 to transmit information.

With the battery protection IC 10 according to the embodiment having the above-mentioned configuration, the permission signal supplied from the higher-level circuit is not supplied to the lower-level circuit until the identification information ID is assigned to the battery protection IC 10. Under the state in which the permission signal is supplied from the higher-level circuit, when receiving the identification information ID from the higher-level circuit through the serial communication line, the battery protection IC 10 according to the embodiment stores the identification information ID as the identification information ID of the self-circuit in the storage of the self-circuit. When the identification information ID is stored in the storage of the self-circuit, the battery protection IC 10 according to the embodiment supplies, to the lower-level circuit, the permission signal supplied from the higher-level circuit.

In other words, the battery protection ICs 10 according to the embodiment sequentially assign the identification information ID to the battery protection ICs 10 from the highest-level circuit to the lowest-level circuit using the serial communication line cascade-connected for the plurality of battery protection ICs 10.

According to the battery protection ICs 10 of the embodiment, the identification information ID can thus be assigned individually to the plurality of battery protection ICs 10 without increasing the number of terminals of the battery protection ICs 10 by cascade-connecting the serial communication line.

Moreover, in the battery protection ICs 10 according to the embodiment, the identification information ID is a signal based on the identification information ID of the higher-level circuit, and the transmission terminal transmits the identification information ID of the lower-level circuit which is generated based on the identification information ID received by the reception terminal and the predetermined value (in this example, "1") to the lower-level circuit. As a result, the battery protection ICs 10 according to the embodiment can assign different identification information ID to the battery protection ICs 10 by a simple method of adding or subtracting the predetermined value.

<Case in which Addition or Subtraction is not Performed on Identification Information ID>

In the above description, there has been described the case in which the controller 11 performs arithmetic processing on the received identification information ID to generate the identification information ID of the lower-level circuit, but the present invention is not limited thereto. The MCU 50 may have a configuration in which identification information ID of the battery protection ICs 10 which is determined in advance is transmitted as data. In this case, the MCU 50 transmits the identification information ID in units of 8 bits depending on the number of cascade-connected battery protection ICs 10. Moreover, the controller 11 transmits the received identification information ID to the lower-level circuit without performing the arithmetic processing on the received identification information ID.

As described above, in the battery protection ICs 10 according to the embodiment, the identification information ID is determined in advance by the circuit (MCU 50) arranged at the highest level among the higher-level circuits, and the lower-level signal output terminal is configured to transmit the identification information ID received by the reception terminal to the lower-level circuit. As a result, the battery protection ICs 10 according to the embodiment can assign desired identification information ID that is determined in advance to the battery protection ICs 10. The example of the volatile memory has been described here as the storage 12 configured to store the identification information ID, but a rewritable non-volatile memory or a non-volatile memory that can be written only once may be used.

<Case in which Identification Information ID of Battery Protection IC 10 of Lowest-Level Circuit is Stored in Advance>

When the battery protection IC 10 is the lowest-level circuit which is farthest from the MCU 50 in the number of stages in the cascade connection the battery protection IC 10 may have a configuration of not transmitting the data indicating the identification information ID to the lower-level circuit. The battery protection IC 10 includes a read only memory (ROM), a flash memory, an SD card, a hard disk drive (HDD), or other non-volatile memory, for example, and may have a configuration in which the information indicating identification information ID of the battery protection IC 10 of the lowest-level circuit is stored in advance in the memory. In this case, when the identification information ID of the battery protection IC 10 of the lowest-level circuit stored in advance, matches the identification information ID stored in the storage 12 the controller 11 does not transmit the data indicating the identification information ID to the lower-level circuit. Specifically, the switch 111 switches the chip select transmission terminal CSX_O to a state of not supplying, to the lower-level circuit, the chip select signal supplied to the chip select reception terminal CSX_I. Moreover, there may be adopted a configuration in which the identification information ID of the lowest-level circuit is contained in a part (for example, low-order bits) of information in transmitting the identification information ID from the MCU 50, and in which, when an added value of the identification information ID matches the identification information ID of the lowest-level circuit, it is determined that the battery protection IC 10 is the lowest-level circuit.

As described above, in the battery protection IC 10 according to the embodiment, when the identification information ID stored in the storage 12 is the identification information ID of the lowest-level circuit, the switch 111 sets the lower-level signal output terminal to a state of being incapable of outputting the second permission signal. As a result, the battery protection ICs 10 according to the embodiment can assign the identification information ID only to a desired number of battery protection ICs 10 of the cascade-connected battery protection ICs 10.

What is claimed is:

1. A battery protection integrated circuit, comprising:
   a higher-level reception terminal connected to a transmission terminal of a higher-level circuit that is adjacent in cascade connection, and configured to receive information from the higher-level circuit;
   a lower-level transmission terminal connected to a reception terminal of a lower-level circuit that is adjacent in the cascade connection, and configured to transmit information to the lower-level circuit;
   a storage configured to store the information received by the higher-level reception terminal as a unique identification information;
   a higher-level signal input terminal configured to be supplied with a permission signal indicating permission of communication supplied from the higher-level circuit;
   a lower-level signal output terminal configured to output a second permission signal to the lower-level circuit, the second permission signal being generated based on the permission signal supplied to the higher-level signal input terminal;
   a storage controller configured to have the information received by the higher-level reception terminal store as a unique identification information in the storage under a condition that the identification information is not stored in the storage, and that the permission signal is supplied to the higher-level signal input terminal; and
   a switch configured to put the lower-level signal output terminal to a state in which an output of the second permission signal is not provided when the identification information is not stored in the storage, and put the lower-level signal output terminal to a state in which an output of the second permission signal is provided when the identification information is stored in the storage.

2. A battery protection integrated circuit according to claim 1,
   wherein the identification information has a signal based on identification information of the higher-level circuit, and
   wherein the lower-level transmission terminal is configured to transmit identification information of the lower-level circuit which is generated based on the identification information received by the higher-level reception terminal to the lower-level circuit.

3. A battery protection integrated circuit according to claim 1,
   wherein the identification information is determined in advance by a circuit arranged at a highest level among the higher-level circuits, and
   wherein the lower-level signal output terminal is configured to transmit the identification information received by the higher-level reception terminal to the lower-level circuit.

4. A battery protection integrated circuit according to claim 2,
   wherein the identification information is determined in advance by a circuit arranged at a highest level among the higher-level circuits, and
   wherein the lower-level signal output terminal is configured to transmit the identification information received by the higher-level reception terminal to the lower-level circuit.

5. A battery protection integrated circuit according to claim 1, wherein the switch is configured to switch, when the identification information stored in the storage is identification information of a lowest-level circuit, the lower-level signal output terminal to the state of stopping outputting the second permission signal.

6. A battery protection integrated circuit according to claim 2, wherein the switch is configured to switch, when the identification information stored in the storage is identification information of a lowest-level circuit, the lower-level signal output terminal to the state of stopping outputting the second permission signal.

7. A battery protection integrated circuit according to claim 3, wherein the switch is configured to switch, when the identification information stored in the storage is identification information of a lowest-level circuit, the lower-level signal output terminal to the state of stopping outputting the second permission signal.

8. A battery management system, comprising:
   a plurality of battery protection integrated circuits of claim 1; and
   a master device,
      the master device and the plurality of battery protection integrated circuits being cascade-connected to serially communicate with one another.

9. A battery management system, comprising:
   a plurality of battery protection integrated circuits of claim 2; and
   a master device,
      the master device and the plurality of battery protection integrated circuits being cascade-connected to serially communicate with one another.

10. A battery management system, comprising:
    a plurality of battery protection integrated circuits of claim 3; and
    a master device, the master device and the plurality of battery protection integrated circuits being cascade-connected to serially communicate with one another.

11. A battery management system, comprising:
a plurality of battery protection integrated circuits of claim 4; and
a master device,
the master device and the plurality of battery protection integrated circuits being cascade-connected to serially communicate with one another.

* * * * *